June 21, 1949.                F. RIEBER                2,473,610
                              BAROMETER
Filed Jan. 29, 1944                              2 Sheets-Sheet 1

INVENTOR.
FRANK RIEBER

June 21, 1949.  F. RIEBER  2,473,610
BAROMETER

Filed Jan. 29, 1944  2 Sheets-Sheet 2

INVENTOR.
FRANK RIEBER
BY

Patented June 21, 1949

2,473,610

UNITED STATES PATENT OFFICE 2,473,610

BAROMETER

Frank Rieber, New York, N. Y., assignor to Interval Instruments, Inc., New York, N. Y., a corporation of New York Application January 29, 1944, Serial No. 520,201

9 Claims. (Cl. 250—36)

This invention relates to a barometer, more particularly to a device for measuring atmospheric pressures with a high degree of accuracy and free from errors due to temperature or to friction or lost motion within the instrument itself.

It is an object of this invention to provide a barometer which will measure pressures with extreme accuracy and reliability. It is a further object to provide a device in which the air pressure sensitive element may be made extremely small, and yet the indicating or recording device may, by amplification, be made to furnish any quantity of power desired, free from any errors of transmission or amplification. It is a further object by which a barometric sensitive element may be placed at one point and the response of that element may be transferred to a distant point, and accurately reproduced and utilized with no errors of transmission.

It is a further object to produce a device of the character described, in which the range of the instrument may be externally controlled with a high degree of accuracy and within that range the instrument may be caused to respond with extreme sensitivity and reliability.

It is a further object to provide a device in which the strains imposed by the pressures to be measured are resisted by a member in direct tension, such as a tension wire, so that the sensitive diaphragm of the instrument is freed from serious or permanent distortion.

It is a further object to provide a device in which the range of the instrument may be altered easily and at will without the need of making any alteration of the sealed diaphragm chamber.

It is an object of this invention to provide a device in which the variations in pressure are caused to exert changes in tensional strains in an almost inextensible body, such as a wire, so that the measurements may be taken without flexure of the diaphragm.

In my copending applications for telegauges and for pressure gauges, filed of even date herewith and bearing Serial Nos. 520,200 and 520,199, Patent No. 2,447,817, dated August 24, 1948, respectively, I have disclosed a pressure gauge in which a pressure responsive element varies the tension upon a vibrating body, and in which an oscillating system, taking its frequency from the vibrating body, maintains the body in oscillation at its own natural frequency. In accordance with this invention, that principle is applied to the measurement of atmospheric pressure.

The invention accordingly comprises a device possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which.

Figure 1:
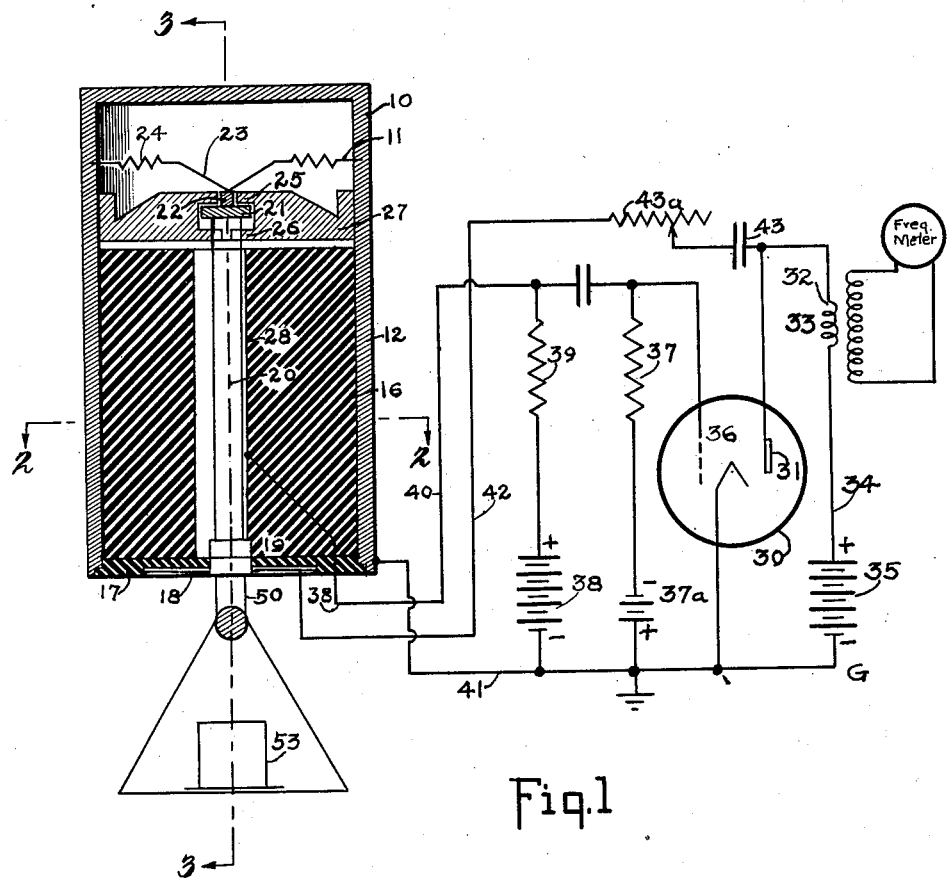
Fig. 1 is a vertical section of a device embodying this invention diagrammatically connected to an oscillating system by which it may be operated and its response transmitted as desired.

In the drawing, the numeral 10 designates a cup shaped member completely closed at its lower end by a diaphragm 11 to form a sealed chamber. This chamber may either be filled with gas or evacuated, as desired. If filled with gas, the expansion of the gas under temperature changes may be compensated by a compensating element as hereinafter described. If evacuated, the instrument will be designed to permit the diaphragm 11 to resist the maximum pressures to which it will be subjected. Extending downwardly from the cup 10 is a shell 12 carrying within it an insulating member which for convenience of manufacture is shown as composed of four portions 13, 14, 15 and 16, and the shell 12 has its lower end closed by an end wall 17 of insulating material. It will be understood that the shell 12 will be so constructed as not to shield the interior from an external magnetic field hereinafter described, and this may be done by constructing it of a non-magnetic material.

It will of course be understood that this shell is properly vented as is common in all devices of this kind to permit free access of air pressure to the outside of diaphragm 11.

Means are preferably provided for compensating for temperature changes which will correct for all of the expansible elements within the system. This is shown in the drawings in the form of a bimetallic strip 18 set within the insulating member 17 and carrying at its center a block 19, to which is fastened the lower end of a vibrating wire 20, the upper end of which is supported by a bar 21, the central portion 22 of which is attached to the center of the diaphragm 11. We shall use the term electromagnetic strand to indicate a strand or wire responsive to electromagnetic forces whether it be magnetic or electric and whether it be controlled electrically or magnetically.

As will be seen from the drawing, this diaphragm is preferably in the form of a stiff central portion, as for example a conical portion 23 surrounded by an annular flexible portion 24, and thus the strain upon the wire 20 is directly imposed upon the central portion in this diaphragm. The bar 21 at its uppermost point of travel is arranged to engage fingers 25, and at its lowermost point of travel to engage fingers 26 upon a bracket 27 carried by the shell 12, to limit the actual movement of the rod and hence of the diaphragm.

It will be understood that in accordance with this invention the pressure is indicated not by the movement of the diaphragm, since the latter is restrained against motion at all times by the wire. Although of course there is a very small stretching of the wire under the variations of tension, this plays no useful part in the indications. The barometric pressure is indicated by the physical pressure exerted by the diaphragm upon the wire corresponding to the tension in the wire. Thus there is almost no movement in the upper end of the wire, and as a consequence there is almost no movement of the bar 21 between its guides which can thus be very close to the bar itself.

There is no appreciable deflection of the diaphragm regardless of pressure, so that the deflection characteristics of the diaphragm do not affect the readings, and changes in tension in the wire are thus responsive accurately to changes in barometric pressure regardless of the scale range chosen.

The insulators comprising the parts 13, 14, 15 and 16 are designed to fit within the shell 12, but at one point, as for example upon an apex 27 of the member 16, there is mounted a linear electrode 28 in position to be supported by the insulators closely adjacent to and parallel to the wire 20.

Figure 2:
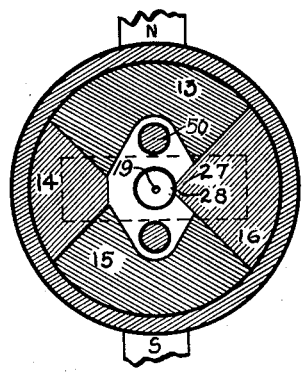
Fig. 2 is a section on the line 2—2 of Fig. 1.
Figure 3:
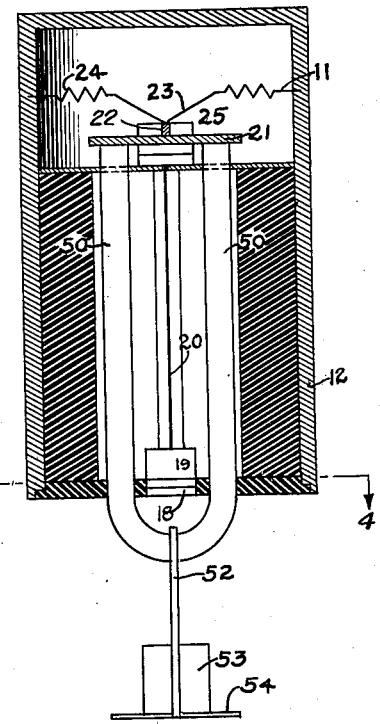
Fig. 3 is a vertical section on the line 3—3 of Fig. 1.
Figure 4:
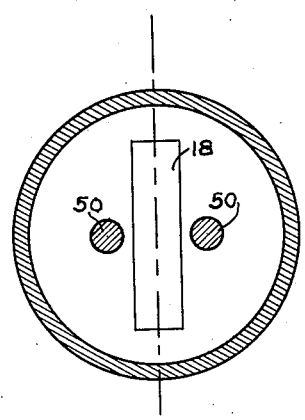
Fig. 4 is a section on the line 4—4 of Fig. 3.

In use it will be understood that the shell 12 is placed in a magnetic field shown in the drawings of Fig. 2 by the characters N and S, representing the north and south poles of the magnet.

The apparatus in use is connected to an amplifying system herein conventionally shown as a vacuum tube 30 having a plate 31 connected at 32 to a transformer 33, and which in turn is connected at 34 to a plate btatery 35, and thence to ground G. The grid 36 is connected to ground G through a grid leak resistance 37 and a grid bias 37a A battery 38 acting through a high resistance 39 and a conductor 40 maintains a potential between the electrode 28 and the wire 20. The upper end of the wire 20 is connected to the shell comprising the parts 10 and 12, which in turn is connected to the ground by a wire 41, and the lower end of the wire 20 connected to the bimetallic strip 18 is connected to the plate by a lead 42 through a feed back control resistor 43a and a condenser 43.

With the above construction, it will be clear that variations in the capacity between the electrode 28 and the wire 20 will result in variations in the charge upon that electrode relative to the ground, and these variations will operate upon the grid of the ocsillating system to cause oscillation in the system at a frequency determined by the vibrations of the wire 20. The actual movement of the wire is occasioned by the pulsating current passing through it from the plate circuit through the condenser 43 and the wire 42, and back to ground through the wire 41. This current produces a lateral movement in the wire 20 by reason of the magnetic field in which the instrument is placed.

The apparatus in so far as it has heretofore been described will, it will be clear, create an oscillating current corresponding in frequency to the tension imposed upon the wire 20 by the air pressure upon the diaphragm 11, so long as the stop 21 does not rest against either of the lugs 25 or 26, and this oscillating current may be utilized in any manner desired, either directly at a local point or by transmission to a distance by wires, or by transmission to a distance as a modulation of a carrier wave. In any case, since the response is in terms of frequency modulation, there will be no inaccuracies resulting from amplification or transmission, and thus the pressure sensitive element may be made very small while its response may be magnified to produce any amount of power desired without introducing errors in the amplification.

In some instances it is desirable to read minute variations in barometric pressure between certain limits. In such cases there may be attached to the bar 21 an element, by means of which known static forces may be applied to the diaphragm so that the tension upon the wire 20 will correspond to the difference in the force exerted upon the diaphragm by the air pressure and the external static force. As shown, there is attached to the bar 21 a U-shaped bracket 50 conventionally shown as supporting in its lower end a scale pin 54 supported by wire 52.

With this construction, since the wire 20 does not have to sustain the entire force of the diaphragm 11, when weights 53 are applied to the scale pan, the wire 20 may be made smaller in diameter and thus more sensitive to variations in frequency. In such cases, a wire may be chosen, such that the maximum variation in tension in the wire may be just sufficient to cover the narrow range desired, say equivalent to a variation in air pressure of 50 mm. of mercury; then the full scale reading of the instrument, with no weights, may be between 780 and 730 mm., or if appropriate weights be added between 730 and 680 mm., or between 0 and 50 mm., or between any other limits where the upper and lower limits differ by 50 mm.

With such an instrument the degree of accuracy is measurable as a fraction of the maximum variation. When therefore the instrument is so geared as to respond only to a small fraction of the total barometric range, the limit of error in the reading will be correspondingly reduced.

The lower limit of the pressure which the device will measure is that pressure which permits the rod 21 under the influence of the weight 53 to rest against the lower stop 26. The upper limit of vacuum that can be measured is when the rod 21 bears against the stop 25. The difference between these two factors for any given wire is substantially a constant, being in fact the force required to stretch the wire 20 attached to the bimetallic strip by an amount equal to the play between the stops. Thus we have a scale of a fixed sensitiveness of which the lower limit is determined by the weight 53.

There is shown in the drawings a frequency meter for interpreting the indications, and any frequency meter which is accurate may be employed, but I prefer to employ the meter disclosed in my copending application for a transducer filed of even date herewith and bearing Serial No. 520,196, since it is sensitive to the frequency and may readily be used to show its indications directly in terms of pressure, instead of frequency.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. A device of the character described, comprising a generally cylindrical vessel having a closed end, a diaphragm dividing said vessel and forming with said end a sealed vacuum chamber, an insulator in said vessel, a wire stretched between the said diaphragm and said insulator, an electrode of substantially the same length as the vibrating portion of the wire carried by said insulator parallel to said wire, and electrical connections to the said electrode and to each end of said wire.

2. A device of the character described, comprising a generally cylindrical vessel having a closed end, a diaphragm dividing said vessel and forming with said end a sealed vacuum chamber, an insulator in said vessel, a wire stretched between the said diaphragm and said insulator, an electrode of substantially the same length as the vibrating portion of the wire carried by said insulator parallel to said wire, electrical connections to the said electrode and to each end of said wire, and a magnet positioned to establish lines of force transverse to the plane defined by said wire and said electrode.

3. A device of the character described, comprising a generally cylindrical vessel having a closed end, a diaphragm dividing said vessel and forming with said end a sealed vacuum chamber, an insulator in said vessel, a wire stretched between the said diaphragm and said insulator, an electrode carried by said insulator parallel to said wire, electrical connections to the said electrode and to each end of said wire, and means connected to said diaphragm for supporting a weight whereby the tension exerted on said wire by said diaphragm may be altered by a fixed amount and stops to limit the strain on said wire to predetermined values regardless of the value of said weight.

4. A device of the character described, comprising a hermetically sealed chamber having a diaphragm wall carrying a wire support, a wire connected to said support, a second support for the other end of said wire, adapted to maintain said wire under tension whereby variations in pressure upon the diaphragm vary the tension upon the wire, an insulator, an electrode of substantially the same length as the vibrating portion of the wire carried by said insulator parallel to said wire, a terminal for said electrode, a magnet establishing a field of force transverse to the plane of said electrode and said wire, and an oscillator connected to said electrode to have its frequency determined thereby, and having the pulsating current it generates connected to pass through said wire, said oscillator including an electric circuit containing said electrode and said wire as a capacity, and means responsive to changes in said electric circuit due to changes in capacity to control said oscillating system.

5. A device of the character described, comprising a hermetically sealed chamber having a diaphragm wall carrying a wire support, a wire connected to said support, a second support for the other end of said wire adapted to maintain said wire under tension whereby variations in pressure upon the diaphragm vary the tension upon the wire, an insulator, an electrode carried by said insulator parallel to said wire, and of substantially the same length as the vibrating portion of the wire, a terminal for said electrode, means for applying external fixed weights to said diaphragm whereby the tension exerted on said wire by said diaphragm is altered by a fixed and constant amount, stops to limit the movement of said diaphragm wall, a magnet establishing a field of force transverse to the plane of said electrode and said wire, and an oscillator connected to said electrode, and having the pulsating current it generates connected to pass through said wire, said oscillator including an electric circuit containing said electrode and said wire as a capacity, and means responsive to changes in said electric circuit due to changes in capacity to control said oscillating system.

6. A device of the character described, comprising a generally cylindrical vessel having a closed end, a diaphragm dividing said vessel and forming with said end a sealed vacuum chamber, a shell extending out from said chamber, an insulator in the remainder of said vessel, a wire stretched between the said diaphragm and said insulator, an electrode carried by said insulator parallel to said wire and of substantially the same length as the vibrating portion of said wire, electrical connections to the said electrode and to each end of said wire, a magnet establishing a field of force transverse to the plane of said electrode and said wire, and an oscillator connected to said electrode to have its frequency determined thereby, and having the pulsating current it generates connected to pass through said wire.

7. A device of the character described, comprising a generally cylindrical vessel having a closed end, a diaphragm dividing said vessel and forming with said end a sealed vacuum chamber, a shell extending out from said chamber, an insulator in the remainder of said vessel, a wire stretched between the said diaphragm and said insulator, an electrode carried by said insulator parallel to said wire, and of substantially the same length as the vibrating portion of said wire, electrical connections to the said electrode and to each end of said wire, means connected to said diaphragm for supporting a weight whereby the tension exerted on said wire by said diaphragm may be altered by a fixed amount, stops to limit the movement of said diaphragm, a magnet establishing a field of force transverse to the plane of said electrode and said wire, and an oscillator connected to said electrode to have its frequency determined thereby, and having the pulsating current it generates connected to pass through said wire.

8. A barometric device accurately responsive to a preselective limited portion of the normal total range of barometric pressure comprising an hermetically sealed chamber including a deflectable wall portion responsive to atmospheric pressure, an electromagnetic strand tensioned between a support carried by said vessel and said deflectable wall whereby movement of said wall will vary the natural vibration frequency of said strand, a regenerative electrical circuit including said strand for maintaining said strand in continuous vibration in its natural frequency, means for deriving from said circuit an electrical effect, the frequency of which is representative of atmospheric pressure and means for stressing said wall portion independently of said strand for determining the portion of the range of barometric pressures to which the device responds.

9. A barometric device accurately responsive to a preselective limited portion of the normal total range of barometric pressure, adapted for use with an oscillating electrical circuit having means for maintaining a strand in vibration at its natural frequency and having means for deriving from said circuit an electrical effect, the frequency of which is representative of the frequency of a strand, said device comprising an hermetically sealed chamber including a deflectable wall responsive to atmospheric pressure, an electromagnetic strand tensioned between a support carried by said vessel and said deflectable wall, whereby movement of said wall will vary the natural vibration frequency of said strand, and terminals upon said strand whereby it may be connected into said electrical circuit to be driven thereby at its natural frequency, and means for stressing said wall portion independently of said strand for determining the range of barometric pressures to which the device responds.

FRANK RIEBER.

REFERENCES CITED

The following references are of record in the file of this patent:

UNITED STATES PATENTS

| Number | Name | Date |
|---|---|---|
| 1,870,058 | Levine | Aug. 2, 1932 |
| 1,995,305 | Hayes | Mar. 26, 1935 |
| 2,050,674 | Stover | Aug. 11, 1936 |
| 2,253,769 | Dube | Aug. 26, 1941 |
| 2,265,011 | Siegal | Dec. 2, 1941 |
| 2,302,895 | Root | Nov. 24, 1942 |

FOREIGN PATENTS

| Number | Country | Date |
|---|---|---|
| 155,854 | Great Britain | Jan. 6, 1921 |